Dec. 21, 1965 D. D. JOHNSON 3,224,672

TIME-MONEY COMPUTER

Filed July 25, 1963 3 Sheets-Sheet 1

INVENTOR.
DONALD D. JOHNSON.
BY
Flehr and Swain
ATTORNEYS.

Dec. 21, 1965

D. D. JOHNSON 3,224,672

TIME-MONEY COMPUTER

Filed July 25, 1963

3 Sheets-Sheet 2

INVENTOR.
DONALD D. JOHNSON.
BY Flehr and Swain
ATTORNEYS.

Dec. 21, 1965
D. D. JOHNSON
3,224,672
TIME-MONEY COMPUTER
Filed July 25, 1963
3 Sheets-Sheet 3
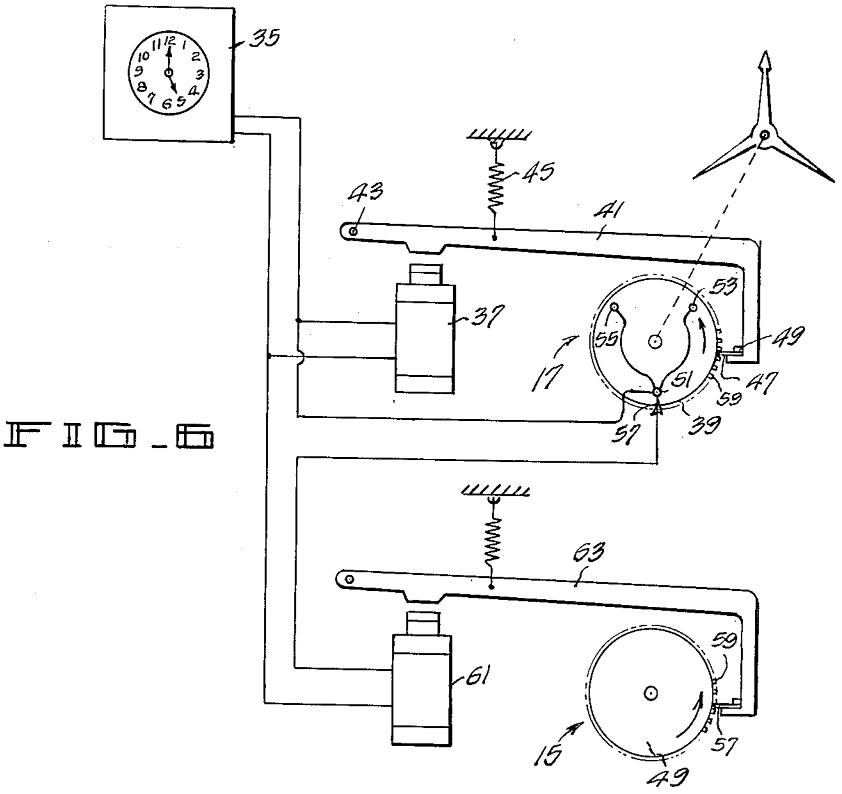
FIG. 6
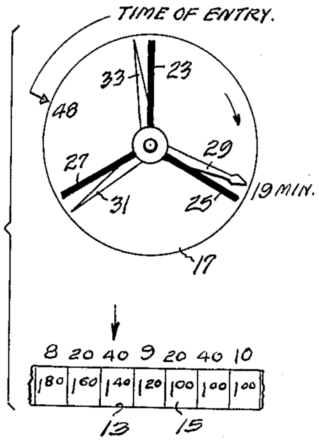
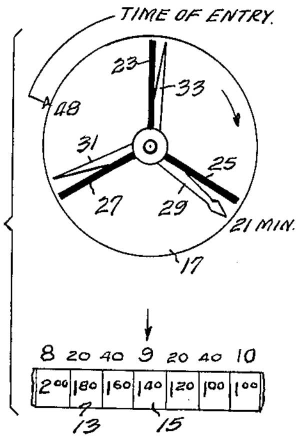
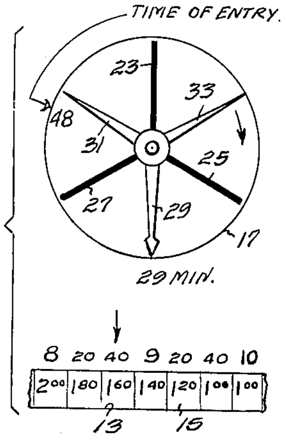
FIG. 7 FIG. 8 FIG. 9
INVENTOR.
DONALD D. JOHNSON,
BY
Flehr and Swain.
ATTORNEYS.

3,224,672
TIME-MONEY COMPUTER
Donald D. Johnson, Malecon de Reserva 355,
Lima, Peru
Filed July 25, 1963, Ser. No. 297,529
3 Claims. (Cl. 235—61)

This invention relates to a time-money computer and more particularly to apparatus for conveniently, reliably and rapidly translating periods of elapsed time into amounts of money dependent upon a fixed tariff.

In many businesses, for instance, in the parking lot business, the amount of money charged the customer is dependent upon the amount of time in which the business' services have been employed. The usual manner in which this is accomplished, in the parking lot business, for instance, is that the customer upon driving into the lot, is presented with a ticket having the time of entry stamped thereon. When the customer subsequently arrives to take his car, time is again stamped on the ticket and an attendant mentally determines the amount of time for which the customer is to be charged. Once having determined this amount of time, the attendant then mentally translates this figure into an amount of money to be charged the customer. Since the attendant is ordinarily operating under pressure from a number of customers, the quick mental calculations are often erroneous and lead to poor customer relations as well as frequent collections of amounts less than should be paid by the customer.

Moreover, in many such parking lots the rate charged the customer varies. For instance, frequently the rate for the first hour of parking is higher than the rate for subsequent hours. Here again the attendant is taxed in his mental calculations to induce even further errors.

It is, therefore, a general object of this invention to provide a time-money computer which readily permits an attendant to determine the exact amount of money which the customer is to be charged.

It is a more particular object of this invention to provide a time-money computer which is suitable for use to quickly translate an amount of time to an amount of money dependent upon a fixed tariff.

The above and other objects and features of the invention will become more clearly apparent upon a review of the following description in conjunction with the accompanying drawing, in which:

FIGURE 6 is a schematic diagram showing electrical and mechanical connections of a minute adjusting device, money reading cylinder and a master clock in accordance with this invention; and FIGURES 7, 8 and 9 are each views indicating the use of the invention under particular circumstances.

Figure 1:
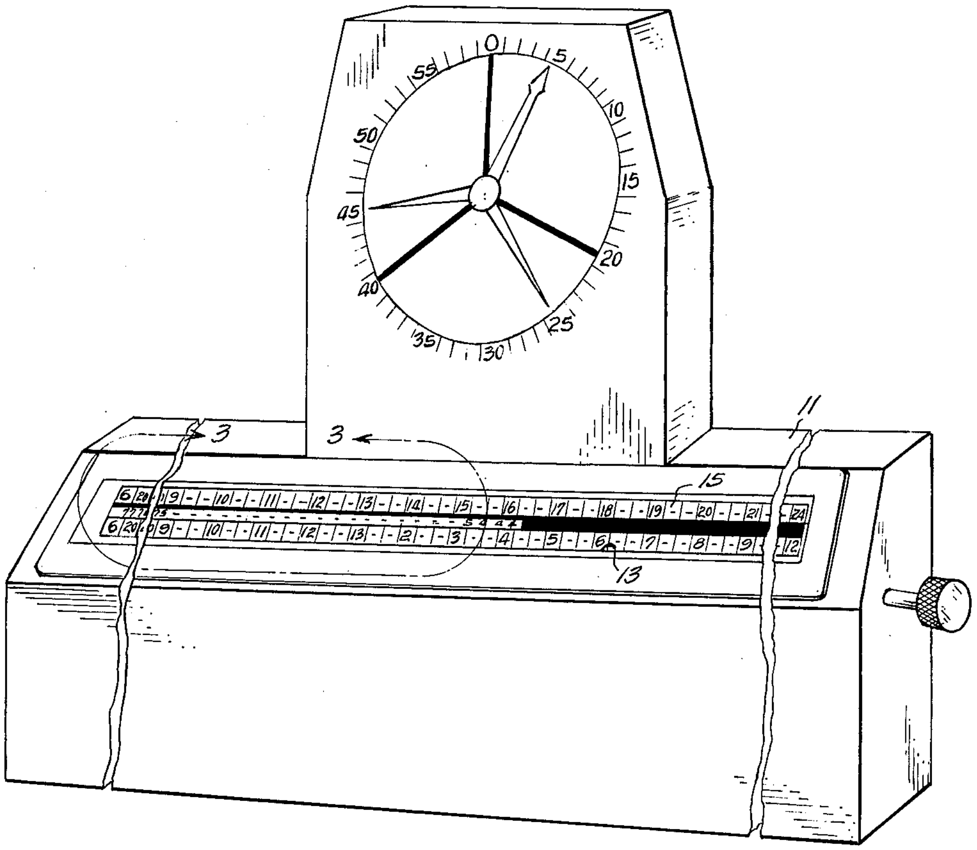
FIGURE 1 is an elevational view of a time-money computer in accordance with the invention.

Referring to FIGURE 1, there is shown a housing 11, the front face of which includes an elongated slot 13. A money reading cylinder 15 is mounted behind the slot 13 such that a portion thereof is exposed to the slot. A minute adjusting device or clock 17 is also mounted on the face of the housing 11 and is interconnected with the cylinder 15 therein, as will be described hereinafter.

Figure 3:
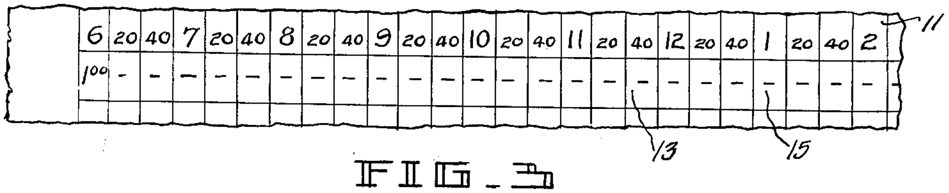
FIGURE 3 is an enlarged view of a portion of FIGURE 1, as shown by the line 3—3 of FIGURE 1.

That portion of the housing directly above the slot 13 includes indicia thereon, as indicated in FIGURE 3, relating to the various times of day. In a preferred embodiment of the example, the indicia includes each of the hours of day from 6:00 a.m. to 12:00 p.m., as well as indicia corresponding to twenty and forty minutes past each hour.

Figure 2:
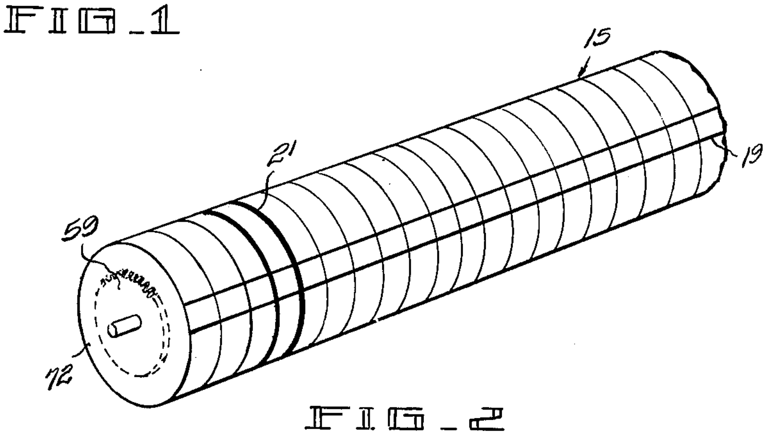
FIGURE 2 is a perspective view of a money reading cylinder for use in accordance with the invention.
Figure 4:
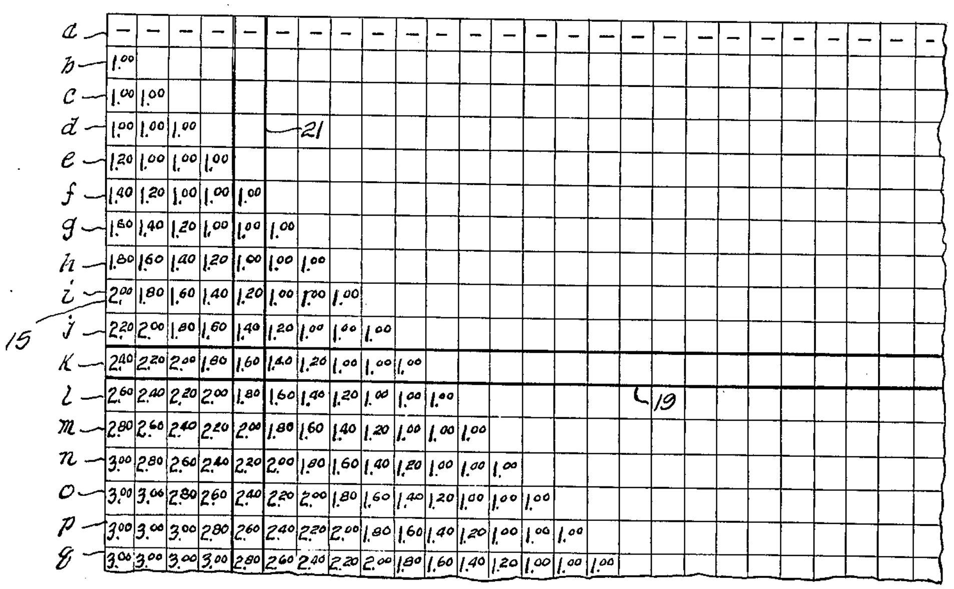
FIGURE 4 is an enlarged plan developed view of a portion of the cylinder shown in FIGURE 2.

As can be seen in FIGURE 2, the cylinder 15 is divided into a plurality of axial channels 19 and further into a plurality of annular rings 21. At the intersection of each of the channels and rings, there is engraved, or otherwise affixed to the cylinder, indicia corresponding to amounts of money, as shown in FIGURE 4. As can be seen by FIGURE 4, in conjunction with FIGURE 3, each of the annular rings 21 corresponds to an individual time indicia on the face of the housing 11. Thus, the leftmost ring 21 corresponds to the indicia on the housing 11 of 6:00 a.m., the next ring corresponding to 6:20 a.m., etc.

As will be seen hereinafter, the cylinder 15 is arranged to rotate by an angle corresponding to the width of one of the channels 19, each twenty minutes of the day. Thus, at 6:00 a.m. the uppermost channel 19 (FIGURE 4) will be in alignment with the slot 13, as shown in FIGURE 3. At 6:20 a.m. the next lower channel 19 is aligned with the slot 13, and so forth, throughout the day.

The information on the cylinder 15 is disposed thereon in such a manner as to display through the slot 13 the amount of money owed by customers which have brought their cars to the lot at any hour of the day. Thus, considering a channel 19 of information shown between the heavy lines in FIGURE 4, it should be realized that such channel will appear in registry with the slot 13 after nine twenty minute intervals starting, as will be seen hereinafter, at 6:01 a.m. Thus, until 6:01 a.m. the channel designated *a* will lie beneath the slot 13 and at 6:01 a.m. the channel *b* registers with the slot; at 6:21 a.m. the channel *c*, 6:41 a.m. the channel *d*, at 7:01 a.m. the channel *e*, and so forth. With these factors in mind an example may be taken wherein a customer may be assumed to have brought his car into the lot at 7:20 a.m. and arrived to pick it up again at 9:20 a.m. Between the time of 9:01 a.m. and 9:21 a.m., the channel 19 designated *k* lies in registry with the slot 13 and thus it is apparent that if an attendant merely views that portion of the channel 19 which lies in registry with the indicia on housing 11 designating 7:20, the time of entry, he reads the amount to be charged correctly at $1.60. (Note ring 21 in heavy lines in FIGURE 4.) If the customer does not return until 9:21 a.m., it is recognized that the next time zone has been invaded and the cylinder rotates until the channel 1 lies in registry with the slot 13 wherein the amount to be read would be $1.80.

It should be realized, however, that customers do not always arrive and leave at the exact times designated by the time zone indicia on the housing 11. Consequently, means are provided in the form of a minute adjusting device to assist the attendant in selecting which of the indicia on the housing 11 is to be read. The minute adjusting device, shown in FIGURE 5, includes a face similar to a clock face having radial lines 23, 25 and 27 scored at the hour and at twenty minutes and forty minutes after the hour, respectively. The minute adjusting device has no hour hand but includes three minute hands 29, 31 and 33 which rotate together and are maintained at angles of 120° apart. The major minute hand 29 is disposed to register the correct time of day, insofar as minutes are concerned.

Referring to FIGURE 6, interconnection between the minute adjusting device 17 and the money reading cylinder 15 may be seen as they are associated with the master clock 35. The master clock 35 is in itself a conventional device which emits a short electrical pulse at the beginning of each sixty second interval. The output of the clock is connected to a solenoid 37 associated with the minute adjusting device 17. The minute adjusting device 17 further includes a wheel 39 having sixty teeth thereabout corresponding to each of the minutes of an hour. The wheel 39 is connected to the minute hands 29, 31 and 33 whereby rotation of the wheel 39 causes rotation of the minute hands.

A lever 41 associated with the solenoid 37 is pivoted as at 43 and resiliently urged upward by means of a spring 45. At the end of the lever opposite the pivot 43 is a pawl 47 which is disposed for movement in a clockwise rotation about a pivot point 49 but with its counterclockwise rotation limited to the position shown. The pawl 47 may be of any conventional type, such, for instance, as the clapper or spring type. It is apparent, therefore, that upon the application of an electrical pulse to the solenoid 37 from the master clock 35, the lever 41 is rotated downwardly whereby the pawl 47 engages a tooth on the wheel 39. As the solenoid 37 is released, the lever 41 is urged upwardly by means of the spring 45 such that the wheel 39 is rotated through an angle corresponding to one tooth thereon. Since the pulses are directed to the solenoid 37 once every minute, it is apparent that the wheel 39 and consequently, the minute hands 29, 31 and 33 are rotated one step each minute.

Also connected to the wheel 39 are three electrical contacts 51, 53 and 55 and a wiper 57 for selective communication with the contacts. The contacts 51, 53 and 55 are spaced equiangularly about the wheel 39 such that the wiper 57 communicates with one or the other of contacts 51, 53, or 55 at intervals of twenty pulses (corresponding to twenty minutes) to the solenoid 37.

The money reading cylinder 15 includes at one end thereof a toothed wheel 59, shown in FIGURES 2 and 6. The wheel 59 includes seventy-two teeth corresponding to the number of twenty minute periods throughout a twenty-four hour day. Also associated with the master reading cylinder is a solenoid 61 and levers 63 similar to the solenoid 37 and the lever 51 of the minute adjusting device. The solenoid 61 and lever 63 cooperate with the wheel 49 such that upon each impulse to the solenoid 61, the wheel is rotated through an angle corresponding to one tooth thereon. A line from the master clock is connected as one input to a solenoid 61 and the other input line is connected to the other side of the master clock through the wiper 57 and through one of the contacts 51, 53 or 55.

Figure 5:
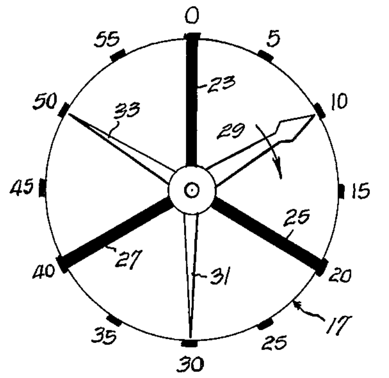
FIGURE 5 is an elevational view of a minute adjusting device for use in accordance with the invention.

In operation of the device, shown in FIGURE 6, it is apparent that upon each pulse from the master clock 35 the wheel 39 is rotated through an angle corresponding to one minute on the face of the minute adjusting device as shown in FIGURE 5.

As shown in FIGURE 6, when the master clock moves to the position of five o'clock, a pulse is transmitted to the solenoid 37 and the pawl 47 on the lever 41 engages the next adjacent tooth on the wheel 39. Upon termination of the pulse from the clock 35, the spring 45 on the lever 41 rotates the wheel 39 to the position as shown in FIGURE 6, whereby the contact 51 communicates with the wiper 57. In this position of the wheel 39, relative to the wiper 57, it is noted that the master clock 35 is electrically connected to the solenoid 61. Consequently, upon the next pulse from the clock 35, which will occur at 4:01 o'clock, the pulse is applied not only to the solenoid 37 but also to the solenoid 61. Upon termination of this later pulse both the wheels 39 and 59 are rotated. Thus at 4:01 o'clock the minute hand 29 registers with the one minute after the hour position and the money reading cylinder 15 rotates such that the next channel 19 is in registry with the slot 13 on the housing 11.

Operation of the time-money computer, and reading of the minute adjusting device will be more easily understood by considering the following four rules of operation in conjunction with the face of the minute adjusting device 17.

Upon reviewing the minute adjusting device 17 at the time a customer picks up his car:

(1) If the minute of the hour of the time of entrance into the parking lot falls between two of the minute hands 29, 31 or 33, the minute of the hour to be used for the purpose of reading the proper indicia on the housing 11 is that minute time shown by the radius line 23, 25 or 27 which also lies between the same two minute hands.

(2) If the minute of the hour of entrance to the parking lot coincides with one of the minute hands 29, 31 or 33, the time to be used is that designated by the radius line 23, 25 or 27 next adjacent to the time of entry in the clockwise direction.

(3) If the minute of the hour of entrance to the parking lot coincides with one of the radius lines 23, 25 or 27, the time to be used is as indicated by that radius line.

(4) If the three minute hands 29, 31 and 33 coincide with the three radius lines 23, 25 and 27 and the minute of the hour of entrance into the parking lot falls between any of the minute hands, then the minute time to be used is as indicated by the radius line next adjacent the time of entry in the clockwise direction.

The use and operation of the device will be more easily understood upon reviewing the following specific examples as shown in FIGURES 7, 8 and 9. In each of the examples it will be assumed that the driver brought his car into the parking lot at 8:48 a.m. and such time is indicated in each of the FIGURES 7, 8 and 9 by the arrow designated Time of Entry. In the first example, as shown by FIGURE 7, it is assumed that the time of picking the car up is at 10:19 a.m. At 10:19 a.m. the minute adjusting device 17 is as shown in FIGURE 7 and the channel *n* (FIGURE 4) of the cylinder 15 lies in registry with the slot 13. The minute of the time of entry being forty-eight, it lies between the two minute hands 31 and 33. The minute of the hour to be used in reading the cylinder 15 is, therefore, as indicated by the radial line 27 which also lies between the minute hands 31 and 33. Of course, the radial line 27 corresponds to forty minutes after the hour and thus the time to be employed in reading the cylinder 15 is 8:40 a.m. Thus that portion of the cylinder 15 lying beneath the indicia on the housing 11, corresponding to 8:40 a.m., is read and as seen in FIGURE 7, the amount to be charged the customer is $1.40.

In the example of FIGURE 8, it is assumed that time at which the customer picks up his car is at 10:21 a.m. at which time it is recognized that the cylinder 15 has just been rotated such that the channel 0 lies in registry with the slot 13. Upon again viewing the minute adjusting device 17, it is apparent that the time of entry lies between the two minute hands 31 and 33. Thus the attendant considers 9:00 o'clock to be the time of entry and, therefore, reads the cylinder 15 under the indicia for 9:00 o'clock. Here again, it is seen that the amount to be charged the customer is $1.40.

In the third example, it is assumed that the customer picks up his car at 10:29 a.m. At this time the cylinder 15 is still in the same position, as shown in FIGURE 8. Here the time of entry lies between the minute hands 29 and 31. The time considered by the attendant is indicated by the radial line 27 which also lies between the minute hands 29 and 31. The radial line 27 corresponding to forty minutes after the hour, the attendant reads the time of entry as 8:40 a.m. Here it is seen that the amount to be charged the customer is $1.60.

In view of the above, it is seen that a time-money computer has been provided which assists an attendant in immediately translating an amount of elapsed time into a particular sum of money dependent upon a fixed tariff. As is apparent, the various zones of time to be considered in the tariff and as set forth by the various channels 19, need not be twenty minutes as indicated in the specific example shown but may be of any time duration at all. In general it is seen that the cylinder is used as a determination of the end of the period of elapsed time consumed by the customer and that the indicia on the housing corresponds to the beginning of such period. Moreover, upon viewing FIGURE 4, it is noted that the money amount indicia is sequentially arranged in the various channels and that the difference between adjacent channels is merely a shift in position of the indicia thereon. Consequently, it is apparent that the indicia on the cylinder and on the housing could be interchanged. Also, instead of a cylinder, the invention could be accomplished by a sliding arrangement between the beginning and end time indicia such that the relative position of the two sets of indicia is shifted at the end of each period.

I claim:

1. A computer for translating elapsed time into sums of money dependent upon a fixed tariff comprising a cylinder divided into a plurality of axial channels and annular rings, indicia on said cylinder representing the cost of units of elapsed time, a housing for receiving said cylinder, said housing defining a slot through which said indicia are exposed, indicia adjacent said slot identifying beginning times of a series of time periods of equal duration, a clock face, radial lines on said face dividing the face into equiangular zones corresponding in duration to the last named time periods, a plurality of minute hands cooperating with said clock face, said plurality of minute hands corresponding in number and equiangular spacing to the plurality of radial lines on the clock face to simultaneously register therewith, clock means for rotating said minute hands with respect to said clock face through a predetermined angle corresponding to one of said zones and for thereafter stepping said cylinder through an angle corresponding to the width of one of said channels.

2. A time-money computer for translating periods of elapsed time into amounts of money to be charged in accordance with a fixed tariff, comprising a money reading cylinder, the surface of said cylinder being divided into a plurality of axial channels, each of said channels corresponding to an end time of one of said periods of elapsed time, a housing defining a slot and having indicia along said slot corresponding to beginning times of said periods of elapsed time, said cylinder being disposed in said housing such that one after the other of said channels may be viewed through said slot, a minute adjusting device having a clock face having a plurality of equiangularly spaced time designations relatively fixed thereon to define sectors of said face and a plurality of minute hands corresponding in number and equiangular spacing to the number and spacing of the time designations, and clock means for rotating said minute hands and for rotating said cylinder in a relation thereto such that said number of hands corresponds to the number of said channels appearing in said slot during one complete revolution of each of said hands.

3. A time-money computer for translating periods of elapsed time commencing at random into amounts of money to be charged in accordance with a fixed tariff comprising first indicia means having sequentially arranged thereon indicia corresponding to amounts to be charged for various amounts of elapsed time, second indicia means having sequentially arranged thereon indicia corresponding to predetermined beginning times of a plurality of predetermined equal periods of elapsed time, the indicia on said first and second indicia means being adjacent each other to be correlated to determine an amount to be charged corresponding to elapsed time from one of said predetermined beginning times, a minute adjusting device for adjusting said predetermined beginning time to a random beginning time having a clock face having a plurality of equiangularly spaced time designations thereon and a plurality of minute hands corresponding in number and equiangular spacing to the number and spacing of the time designations, and clock means for rotating said minute hands and for changing the relative position of said first and second indicia means in accordance with the passage of one of said hands through each of said zones.

References Cited by the Examiner

UNITED STATES PATENTS

| | | | |
|---|---|---|---|
| 1,322,362 | 11/1919 | Shilling | 235—87 X |
| 1,333,078 | 3/1920 | Jankower | 235—87 |
| 1,529,827 | 3/1925 | Baker | 235—87 X |
| 2,797,863 | 7/1957 | Shepard | 58—141 X |

LEO SMILOW, *Primary Examiner.*